(12) United States Patent
Wacinski

(10) Patent No.: US 11,237,350 B2
(45) Date of Patent: Feb. 1, 2022

(54) AUTONOMOUS FLUID COMPRESSOR FOR LAYING OPTICAL FIBERS IN A DUCT

(71) Applicant: PLUMETTAZ HOLDING SA, Bex (CH)

(72) Inventor: Andrzej Wacinski, Bex (CH)

(73) Assignee: Plumettaz Holding SA, Bex (CH)

( * ) Notice: Subject to any disclaimer, the term of this patent is extended or adjusted under 35 U.S.C. 154(b) by 247 days.

(21) Appl. No.: 16/473,396

(22) PCT Filed: Feb. 2, 2018

(86) PCT No.: PCT/EP2018/052699
§ 371 (c)(1),
(2) Date: Jun. 25, 2019

(87) PCT Pub. No.: WO2018/141925
PCT Pub. Date: Aug. 9, 2018

(65) Prior Publication Data
US 2020/0150375 A1    May 14, 2020

(30) Foreign Application Priority Data

Feb. 3, 2017 (CH) .................................. 00125/17

(51) Int. Cl.
*G02B 6/44* (2006.01)
*F04B 37/10* (2006.01)

(52) U.S. Cl.
CPC ............ *G02B 6/4464* (2013.01); *F04B 37/10* (2013.01)

(58) Field of Classification Search
CPC ...... G02B 6/4464; G02B 6/4466; F04B 37/10
See application file for complete search history.

(56) References Cited

U.S. PATENT DOCUMENTS

| 3,006,607 A | 10/1961 | Hamrick |
| 3,034,766 A | 5/1962 | Hamrick |
| 3,374,535 A | 3/1968 | Tranel |

(Continued)

FOREIGN PATENT DOCUMENTS

| DE | 29505241 U1 | 7/1996 |
| EP | 0162543 A2 | 11/1985 |

(Continued)

OTHER PUBLICATIONS

International Search Report and Written Opinion for PCT/EP2018/052699 dated May 8, 2018.

(Continued)

*Primary Examiner* — Sung H Pak
(74) *Attorney, Agent, or Firm* — Patterson Thuente Pederson, P.A.

(57) ABSTRACT

Autonomous fluid compressor for supplying compressed fluid to a cable laying device, the fluid compressor comprising a fluid compressing unit arranged to compress fluid and comprising an exhaust valve, an electric motor, for driving the fluid compressing unit, a rechargeable power unit, to supply electric power to the electric motor, a fluid supply port connected to the exhaust valve, characterized in that the fluid compressor including an input unit, for receiving a fluid demand signal indicating a fluid demand from the cable laying device, and a control unit, arranged to control the motor based on the fluid demand signal.

12 Claims, 1 Drawing Sheet

(56) References Cited

U.S. PATENT DOCUMENTS

| | | |
|---|---|---|
| 4,185,809 A | 1/1980 | Jonnes |
| 4,202,531 A | 5/1980 | Hamrick |
| 5,156,376 A | 10/1992 | Spicer |
| 5,197,715 A | 3/1993 | Griffioen |
| 5,474,277 A | 12/1995 | Griffioen |
| 5,699,996 A | 12/1997 | Boyle et al. |
| 5,762,321 A | 6/1998 | Petersen et al. |
| 5,813,658 A | 9/1998 | Kaminski et al. |
| 5,884,384 A | 3/1999 | Griffioen |
| 5,897,103 A | 4/1999 | Griffioen et al. |
| 6,012,621 A | 1/2000 | Hoium et al. |
| 6,264,171 B1 | 7/2001 | Hoium et al. |
| 6,315,498 B1 | 11/2001 | Baugh et al. |
| 6,382,875 B1 | 5/2002 | Plumettaz |
| 6,402,123 B1 | 6/2002 | Rivard |
| 6,540,208 B1 | 4/2003 | Pecot et al. |
| 7,322,421 B2 | 1/2008 | Blacklaw |
| 8,770,550 B2 | 7/2014 | Plumettaz et al. |
| 9,287,689 B2 | 3/2016 | Plumettaz et al. |
| 10,305,266 B2 | 5/2019 | Griffioen |
| 2003/0136952 A1 | 7/2003 | Pecot et al. |
| 2005/0013598 A1 | 1/2005 | Kim |
| 2005/0274576 A1 | 12/2005 | Coder |
| 2006/0219992 A1 | 10/2006 | Fee et al. |
| 2006/0284148 A1 | 12/2006 | Watkins |
| 2012/0267590 A1 | 10/2012 | Plumettaz et al. |
| 2013/0299758 A1 | 11/2013 | Griffioen |
| 2014/0265322 A1 | 9/2014 | Thompson |
| 2015/0268437 A1 | 9/2015 | Chen et al. |
| 2015/0276096 A1 | 10/2015 | Chen |
| 2015/0316041 A1 | 11/2015 | Chen |
| 2019/0165554 A1 | 5/2019 | Griffioen |
| 2019/0341752 A1* | 11/2019 | Radichel ............... H02G 1/086 |

FOREIGN PATENT DOCUMENTS

| | | |
|---|---|---|
| EP | 0442626 A2 | 8/1991 |
| EP | 0445858 A1 | 9/1991 |
| EP | 0467463 | 1/1992 |
| EP | 1832908 | 9/2007 |
| EP | 1832908 A1 | 9/2007 |
| EP | 2031719 A1 | 3/2009 |
| EP | 2031719 B1 | 1/2013 |
| JP | H09113778 A | 5/1997 |
| JP | H09113779 A | 5/1997 |
| WO | WO2005018067 | 2/2002 |
| WO | WO-2007034242 A1 | 3/2007 |
| WO | WO-2007113519 A1 | 10/2007 |
| WO | WO-2007117244 A1 | 10/2007 |
| WO | WO-2010112852 A2 | 10/2010 |
| WO | WO-2013057283 A1 | 4/2013 |

OTHER PUBLICATIONS

Swiss Search Report for Swiss Application No. CH00125/17 dated Mar. 3, 2017.
Office Action dated Dec. 16, 2020 for Japanese Application No. 2019-0532812, 8 pages.
Griffioen W., "Understanding of Cable in Duct Installation: Do's and Don'ts," Proceedings of the 60th IWCS Conference, Nov. 1, 2011, 8 pages.
International Search Report and Written Opinion for International Application No. PCT/EP201/069721 dated Oct. 20, 2017, 11 pages.
International Search Report and Written Opinion for International Application No. PCT/EP2015/053293 dated Apr. 17, 2015, 8 pages.
International Search Report and Written Opinion for International Application No. PCT/EP2018/052699 dated May 8, 2018, 9 pages.
Switzerland Search Report for Application No. CH01006/16 dated Oct. 18, 2016, 2 pages.

* cited by examiner

AUTONOMOUS FLUID COMPRESSOR FOR LAYING OPTICAL FIBERS IN A DUCT

RELATED APPLICATIONS

This present application is a National Phase entry of PCT Application No. PCT/EP2018/052699 filed Feb. 2, 2018, which claims priority to Swiss Application No. 00125/17 filed Feb. 3, 2017, the contents of each being incorporated herein by reference in their entireties.

TECHNICAL FIELD

The present invention relates to a control method of an autonomous fluid compressor, and to an autonomous fluid compressor for supplying compressed fluid to a cable laying device for jetting cables, fibers into a duct or conduit.

BACKGROUND ART

Cable jetting is the process of blowing a cable through a duct while simultaneously pushing the cable into the duct. Compressed fluid such as air is injected through a blowing chamber at the duct inlet and flows through the duct and along the cable at high speed. Drag forces created by such fluid (air) flow lead to move the elongated element along the duct. Pulling pigs might be employed. Pushing the elongated element might be an option, and then only the drag force moves the elongated element.

Typically, a cable laying device having a blowing chamber is connected to a fluid or gas compressor, to be supplied with compressed air at the blowing chamber, and gas pressure and/or gas flow are adjusted manually through a valve installed between the gas compressor and the blowing chamber. Such adjustment is quite difficult to find optimal adjustment of the valve opening, and if laying conditions vary, it is necessary to adjust again the valve opening. In addition, gas compressors comprise a tank, pressurized at a nominal pressure, but real need is often lower, in particular at the beginning of installation. The adjustment (lowering) of gas pressure causes loss of compressed gas energy. This situation isn't a problem if an external and unlimited energy source is used but becomes critical if a battery is used as power supply. Such situation is the same if a liquid is used instead of gas.

SUMMARY

Embodiments of the present invention aim to address the above mentioned drawbacks of the prior art, and to propose first a fluid compressor designed to facilitate compressed fluid supply to a cable laying device, having a fluid demand which can evolve during the cable laying operation, and which needs precise fluid pressure and/or fluid flow supply.

In this aim, a first aspect of embodiments of the invention relates to an autonomous fluid compressor device for supplying compressed fluid to a cable laying device, the fluid compressor comprising:
a fluid compressing unit arranged to compress fluid and comprising an exhaust valve,
an electric motor, for driving the fluid compressing unit,
a rechargeable power unit, to supply electric power to the electric motor;
a fluid supply port connected to the exhaust valve, for being connected to the cable laying device to supply compressed fluid, characterized in that:
the fluid compressor comprising:
an input unit, arranged to be connected to the cable laying device for receiving a fluid demand signal indicating a fluid demand from the cable laying device,
a control unit, connected to the input unit, and arranged to control the motor based on the fluid demand signal received from the input unit, so that the fluid compressing unit delivers compressed fluid, to meet the fluid demand from the cable laying device,
and in that a volume of tubing forming fluid path between the supply port and the exhaust valve is lower than 15 liters, and preferably lower than 10 liters.

The fluid compressor according to the above embodiment is specifically designed to be coupled to a cable laying device, and can receive from the latter a request for specific fluid pressure or fluid flow. The control unit is designed to control the motor (typically an electric motor) driving the fluid compressing unit to set a specific speed, so as to achieve a specific functioning point (pressure/flow), to meet the request from the cable laying device. In other words, the control unit is connected to the motor, to be able to impose any specific rotation speed of the motor (i.e. any speed set between 0 rpm and full speed of the motor). In addition, the fluid compressor according to the invention does not comprise any tank to store compressed fluid. This allows rapid response in the compressed fluid supply, as there is no inertia from a tank diluting the fluid flow characteristics.

The autonomous fluid compressor forms a single apparatus. In particular, the fluid compressing, the electric motor, and the rechargeable power unit are all mounted and or attached to a same frame/structure. There is no need for the operator to connect a wire or tubing between these organs of the machine.

Such compressor is typically used for laying fibers in microducts (for example: with external Ø4 mm/internal diameter Ø3 mm), requiring limited flow, and where energy saving have a large impact on autonomy.

Advantageously, the cable laying device comprises a blowing chamber, and wherein the volume of tubing forming fluid path between the supply port and the exhaust valve is minimized.

Advantageously, the fluid compressing unit presents an engine size, and a ratio between the volume of tubing forming fluid path between the supply port and the exhaust valve, divided by the engine size is lower than 75, and preferably lower than 50. With such ratio, the volume of intermediate tubing (between the fluid compressing unit and the blowing chamber) is limited and the adjustment of flow/pressure is rapidly and effectively achieved at the blowing chamber location. Engine size, or engine displacement, is the swept volume of all the moveable parts inside the engine. In a reciprocating compressor, the engine size, or engine displacement, is the swept volume of all the pistons inside the cylinders in a single movement from top dead center (TDC) to bottom dead center (BDC).

Advantageously, the control unit is arranged to control a rotation speed of the motor. The rotation speed is easily and precisely measured and controlled.

Advantageously, the motor is arranged to measure a rotation speed and/or torque of the motor, and to send to the control unit a feedback signal indicating a rotation speed and/or torque of the motor.

Advantageously, the fluid compressor comprises a pressure sensor arranged to measure a fluid pressure at the supply port, and connected to the control unit to send a pressure signal indicating a pressure of the fluid.

Advantageously, the fluid compressor comprises a flow sensor arranged to measure a fluid flow at the supply port, and connected to the control unit to send a flow signal indicating a flow of the fluid at the supply port.

Advantageously, the fluid compressing unit is a screw or piston compressor.

Advantageously, the fluid is gas, such as air.

Advantageously, the fluid compressing unit is arranged to supply a flow rate of gas up to a maximum flow rate within a range of [200 l/min-300 l/min], e.g. of 250l/min (volume measured at atmospheric pressure), at a pressure up to 16 bar.

Advantageously, the fluid is a liquid.

Advantageously, the fluid compressing unit comprises an intake, to intake fluid at an intake pressure. Advantageously, the fluid at the intake is not pressurized. In other words, the fluid at the intake is at atmospheric pressure. Consequently, the compressing unit is arranged to intake fluid at atmospheric pressure, and to deliver the fluid at the exhaust valve at a pressure strictly greater than the intake pressure.

More generally, the fluid compressing unit is a single stage compressing unit, intaking fluid at atmospheric pressure, and exhausting the fluid at a working pressure. Typically in this case, and when fluid is gas, the fluid compressing unit delivers fluid at a pressure comprised between approx. 1 bar and 12 bars.

More specifically, an aspect of the invention is dedicated to an autonomous fluid compressor having an intake port at atmospheric pressure, directly connected to the fluid compressing unit. This aspect excludes the supply of pressurized fluid to the fluid compressing unit.

Advantageously, the fluid compressing unit comprises a cylinder head, and the cylinder head comprises the exhaust valve. Advantageously, the fluid compressing unit comprises an intake valve, and the cylinder head comprises the intake valve.

More generally, the exhaust valve is arranged immediately downstream the fluid compressing unit, and the intake valve is arranged immediately upstream the fluid compressing unit.

A second aspect of embodiments of the invention relates to a cable laying equipment for laying an elongated element into a duct, comprising a fluid compressor according to the first aspect of the invention, and a cable laying device having a pressure or blowing chamber connected to the fluid compressor.

Advantageously, the fluid compressor is directly connected to the pressure or blowing chamber. In other words, there is no valve between the fluid compressor (and in particular its fluid compressing unit) and the pressure or blowing chamber.

Advantageously, the cable laying equipment comprises a monitoring unit, arranged to receive the feedback signal indicating a rotation speed of the motor, and or the pressure signal indicating a pressure of the fluid, and/or the flow signal indicating a flow of the fluid, and to calculate a pushing force exerted on the elongated element.

Advantageously, the fluid is gas and the cable laying equipment comprises a fluid cooling unit, such as an air cooler.

Advantageously, the fluid cooling unit is arranged downstream the fluid compressing unit. The fluid cooling unit might be integrated in the fluid compressor.

Advantageously, the fluid cooling unit is arranged between the fluid compressor and the pressure or blowing chamber.

The fluid cooling unit might be an air-air exchanger, or a liquid-air exchanger. Advantageously, the internal volume of the fluid cooling unit is lower than 15 liters, and preferably lower than 10 liters. Advantageously, the internal volume of the fluid cooling unit divided by the engine size is lower than 75, and preferably lower than 50. The internal volume of the fluid cooling unit might be defined to be the internal volume of all piping plus heat exchanger located between the exhaust valve of the fluid compressing unit and the entry of the pressure or blowing chamber.

Advantageously, the autonomous fluid compressor and/or the cable laying equipment has no fluid tank. As the electric motor is driven based on the fluid demand, there is no need to store compressed fluid in any tank, so that the equipment is lighter, simpler and avoids the losses of energy, as only the required flow/pressure is supplied to the blowing chamber. In particular, there is no initial phase of pressurizing a tank (or connecting a pressurized source to the machine), prior to of start the cable laying operation. The cable laying operation starts immediately, as the autonomous fluid compressor supplies pressurized fluid as soon as the fluid compressing unit is operated.

It has to be noted that the machine according to the invention is designed to be used in industrial conditions, with laying operations lasting possibly more than an hour, up to three or four hours with no stop (it is important to never stop the cable movement during its introduction along the duct). In other words, the autonomous fluid compressor and/or the cable laying equipment are designed to be continuously operated during long periods of time. The rechargeable power unit, fluid compressing unit, bearings are designed accordingly.

Other features and advantages of embodiments of the present invention will appear more clearly from the following detailed description of particular non-limitative examples of the invention, illustrated by the appended drawings.

DETAILED DESCRIPTION

Figure 1:
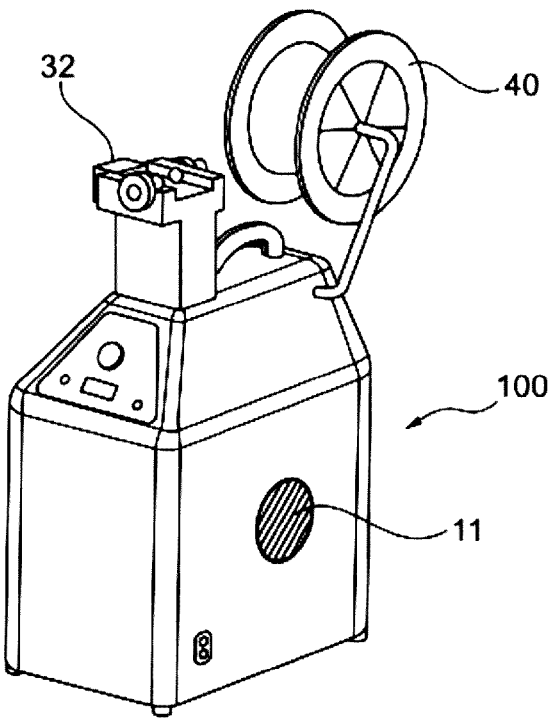
FIG. 1 represents a perspective view of a cable laying equipment comprising a gas compressor according to the invention.
Figure 2:
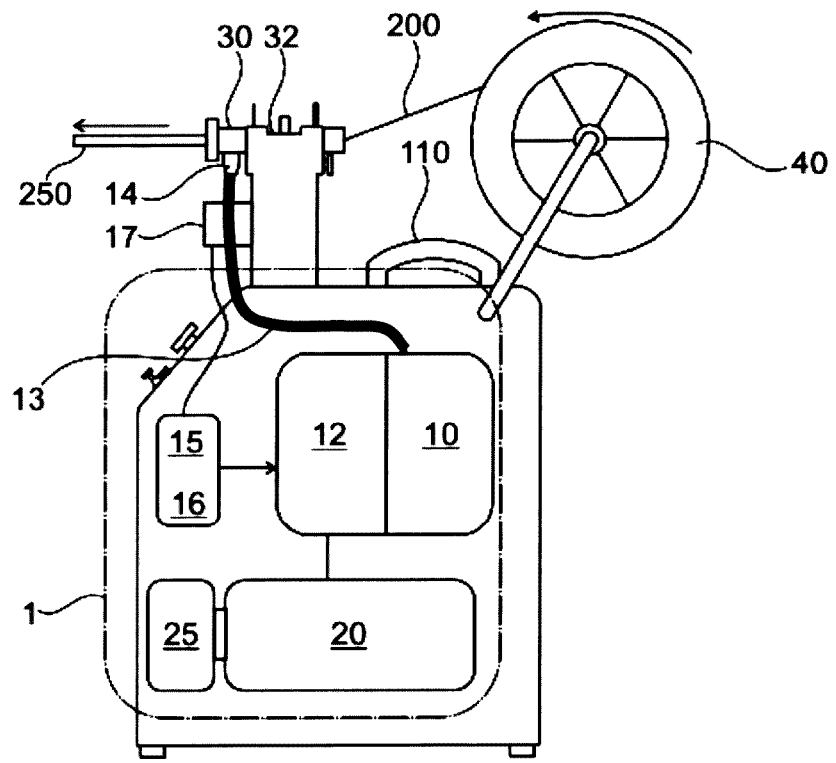
FIG. 2 represents a functional sketch of the cable laying equipment of FIG. 1.

FIG. 1 represents a cable laying equipment 100 for laying an elongated element 200 into a duct 250 (shown FIG. 2). In this aim, the cable laying equipment 100 comprises a reel 40, storing the elongated element 200, and a cable laying device 32 with an air introduction chamber 30 (also called pressure or blowing chamber), for being connected to the duct 250, to jet or blow the elongated element into the duct 250. An adequate fluid to perform such operation is gas, and in particular air.

The jetting operation is an effective method to install a substantial length of the elongated element along the duct 250. Typically, the elongated element is an optical fiber or a bundle of optical fibers, and the duct is a tube laid for example into the ground or in a building, between two connection boxes.

As shown on FIG. 2, the cable laying equipment 100 comprises an autonomous gas compressor 1 comprising:
- a gas compressing unit 10 arranged to compress gas and comprising an exhaust valve,
- an electric motor 12, for driving the gas compressing unit 10, a rechargeable power unit 20, such as a battery, to supply electric power to the electric motor of the compressor and the electric motor of the blowing device;

a gas supply port 14 connected to the exhaust valve, connected to the blowing chamber 30 of the cable laying device 32 to supply compressed gas via a pipe 13, an input unit 15, connected to the cable laying device for receiving a gas demand signal indicating a gas demand from the cable laying device, a control unit 16, connected to the input unit 15, and arranged to control the motor 12 based on the gas demand signal received from the input unit 15, so that the gas compressing unit 10 delivers compressed gas, to meet the gas demand from the cable laying device. The gas compressing unit 10 is connected to an external inlet port protected by a grid 11, visible on FIG. 1.

In addition, the autonomous gas compressor comprises a charger 25, to be connected to an electric network, in order to charge the rechargeable power unit 20 when needed. Accordingly, the autonomous gas compressor can be used in places where no electric power is available, such as for example a building under construction, or a work site not connected yet with electric power, where optical fiber installation is required. To improve the use, a handle 110 is provided, so that an operator can easily transport and move the whole cable laying equipment 100.

As shown FIG. 2, during use, the gas compressing unit 10 is providing compressed gas to the blowing chamber 30, to jet the elongated element 200 (an optical fiber for example) into a duct 250. The elongated element 200 is coiled onto a reel 40, which is unwinding during the jetting operation. A pipe 13 is connecting the gas compressing unit 10 to the blowing chamber 30 via a gas supply port 14.

Close or integrated to the blowing chamber 30 are arranged a sensor unit 17, comprising a pressure sensor and/or a flow sensor, respectively arranged to measure the gas pressure into the blowing chamber 30, and the gas flow supplied to the blowing chamber 30. In addition, the sensor unit 17 can comprise a buckling sensor, to measure if buckling of the elongated element 200 occurs at the entry of the blowing chamber 30. In addition also, the sensor unit 17 can comprise a speed sensor, to measure introduction speed of the elongated element 200.

All these sensors are connected to the input unit 15 of the autonomous gas compressor 1, so as to define a gas supply need. In reaction, the control unit 16 can control the electric motor 12 so as to adjust its rotation speed. Consequently, the gas compressing unit 10 is supplying an adequate flow/pressure of compressed gas through pipe 13, so as to get proper jetting conditions.

As a result, the autonomous gas compressor 1 is able to adjust the gas flow/pressure without any regulation valve between the gas compressing unit 10 and the blowing chamber 30. There is no gas tank as well, thus minimizing the energy required to lay the elongated element 200 (no need to initially pressurize the gas tank, no losses caused by venting the tank to reduce the pressure).

As an example, if the buckling sensor in the sensor unit 17 detects a buckling (deviation of the position of the elongated element from its straight position), the input unit 15 will receive a signal from the buckling sensor and the control unit 16 will at least increase the rotation speed so as to increase the flow/pressure of the gas supplied through the pipe 13, to increase the drag force to move the elongated element and avoid any tangling-curvature of the elongated element 200 into the duct 250.

To efficiently control the laying of the elongated element 200, it is important to minimize the inertia of the cable laying equipment, and one parameter is the volume of intermediate piping between the gas compressing unit 10 and the blowing chamber 30. Embodiments of the invention aim to limit this volume (mainly the volume of pipe 13 of FIG. 2, but can comprise other elements), and in particular, such volume is limited to 10 liters maximum (measured at atmospheric pressure or with a liquid).

The gas compressing unit 10 is typically a piston or reciprocating compressor, and can present an approximate engine size of 200 cm$^3$ (engine size, or engine displacement is the swept volume by the pistons during one cycle). Preferably the ratio between the volume of intermediate piping divided by the engine size is maximum 75, and in the given example, lower or equal to approx. 50 (10 liters divided by 0.2 liters).

The electric motor 12 is chosen to be able to be driven at different speeds by the control unit 16, and is able to send back to the control unit 16 a signal indicative of its rotation speed. As an example, the electric motor 12 can comprise an encoder. As an example, the electric motor can be a synchronous or asynchronous motor, or a brushless motor.

Of course, adjusting the gas flow as quick as possible is the aim of embodiments of the invention, with a fluid compressor having low inertia, but if for instance buckling is detected and gas flow is increased in reaction, it might take a certain time for the new flow to establish all along the duct, so that the control unit can have an instruction to wait until a defined time to make a further change of pressure or flow condition. In particular, this waiting time can be calculated taking into consideration the volume of the duct (its length and internal diameter, diameter of elongated element and length already introduced . . . ) and the flow rate of the gas compressor. In some cases, it might take several minutes for the new flow conditions to be established and constant.

It is of course understood that obvious improvements and/or modifications for one skilled in the art may be implemented, still being under the scope of the invention as it is defined by the appended claims.

The invention claimed is:

1. An autonomous fluid compressor device for supplying compressed fluid to a cable laying device, the fluid compressor comprising:
   a fluid compressing unit arranged to compress fluid and comprising an exhaust valve,
   an electric motor, for driving the fluid compressing unit,
   a rechargeable power unit, to supply electric power to the electric motor;
   a fluid supply port connected to the exhaust valve, for being connected to the cable laying device to supply compressed fluid, wherein
   the fluid compressor includes:
   an input unit, arranged to be connected to the cable laying device for receiving a fluid demand signal indicating a fluid demand from the cable laying device,
   a control unit, connected to the input unit, and arranged to control the motor based on the fluid demand signal received from the input unit, so that the fluid compressing unit delivers compressed fluid, to meet the fluid demand from the cable laying device,
   and in that a volume of tubing forming fluid path between the supply port and the exhaust valve is lower than 15 liters.

2. A fluid compressor according to claim 1, wherein the fluid compressing unit presents an engine size, and wherein the ratio between the volume of tubing forming fluid path between the supply port and the exhaust valve, divided by the engine size is lower than 75.

3. A fluid compressor according to claim 1, wherein the control unit is arranged to control a rotation speed of the motor.

4. A fluid compressor according to claim 1, wherein the motor is arranged to measure a rotation speed and/or torque of the motor, and to send to the control unit a feedback signal indicating a rotation speed of the motor.

5. A fluid compressor according to claim 1, comprising a pressure sensor arranged to measure a fluid pressure at the supply port, and connected to the control unit to send a pressure signal indicating a pressure of the fluid.

6. A fluid compressor according to claim 1, comprising a flow sensor arranged to measure a fluid flow at the supply port, and connected to the control unit to send a flow signal indicating a flow of the fluid at the supply port.

7. A fluid compressor according to claim 1, wherein the fluid compressing unit is a screw or piston compressor.

8. A fluid compressor according to claim 1, wherein the fluid is a gas.

9. A fluid compressor according to claim 1, wherein the fluid is a liquid.

10. Cable laying equipment for laying an elongated element into a duct, comprising a fluid compressor according to claim 1 and a cable laying device having a pressure chamber connected to the fluid compressor.

11. Cable laying equipment according to claim 10, wherein the fluid compressor is directly connected to the pressure chamber.

12. Cable laying equipment according to claim 10, comprising a monitoring unit, arranged to receive the feedback signal indicating a rotation speed of the motor, and or the pressure signal indicating a pressure of the fluid, and/or the flow signal indicating a flow of the fluid, and to calculate a pushing force exerted on the elongated element.

* * * * *